(12) United States Patent
Loeffler

(10) Patent No.: US 8,763,632 B2
(45) Date of Patent: Jul. 1, 2014

(54) FLOW- AND PRESSURE-CONTROL VALVE

(75) Inventor: Gerhard Loeffler, Olsberg (DE)

(73) Assignee: Oventrop GmbH & Co. KG, Olsberg (DE)

( * ) Notice: Subject to any disclaimer, the term of this patent is extended or adjusted under 35 U.S.C. 154(b) by 415 days.

(21) Appl. No.: 12/600,896

(22) PCT Filed: Apr. 18, 2008

(86) PCT No.: PCT/DE2008/000669
§ 371 (c)(1), (2), (4) Date: Nov. 30, 2009

(87) PCT Pub. No.: WO2009/127173
PCT Pub. Date: Oct. 22, 2009

(65) Prior Publication Data
US 2010/0170581 A1 Jul. 8, 2010

(51) Int. Cl.
*G05D 9/12* (2006.01)

(52) U.S. Cl.
USPC ...... 137/497; 137/503; 137/505.25; 137/553; 251/309; 251/319

(58) Field of Classification Search
USPC ............ 137/495, 497, 500, 503, 505.25, 553; 251/315.01–315.16, 309, 319
See application file for complete search history.

(56) References Cited

U.S. PATENT DOCUMENTS

| | | | |
|---|---|---|---|
| 1,593,648 A * | 7/1926 | Berger | 137/116.5 |
| 2,025,696 A * | 12/1935 | Branche | 431/202 |
| 3,777,481 A * | 12/1973 | Canale et al. | 60/39.281 |
| 4,323,086 A * | 4/1982 | Gneiding | 137/495 |
| 4,655,246 A * | 4/1987 | Phlipot et al. | 137/505.11 |
| 5,566,713 A * | 10/1996 | Lhomer et al. | 137/613 |
| 5,642,752 A * | 7/1997 | Yokota et al. | 137/413 |
| 5,678,602 A * | 10/1997 | Cannet et al. | 137/505.25 |
| 6,374,853 B1 * | 4/2002 | Callies | 137/495 |
| 6,478,046 B2 * | 11/2002 | Gabrel | 137/505.42 |

(Continued)

FOREIGN PATENT DOCUMENTS

| DE | 1955900 | 8/1962 |
|---|---|---|
| DE | 19824630 | 12/1998 |

(Continued)

*Primary Examiner* — William McCalister
(74) *Attorney, Agent, or Firm* — Andrew Wilford

(57) ABSTRACT

The invention relates to a valve combination for regulating the rate of flow or the differential pressure in liquid-conveying heating and cooling systems, consisting of a housing (2) provided with a feed pipe (10), a discharge pipe (11) and a connection pipes (6) arranged between them and a regulator (3) which is arranged axially in the connection pipe (6), wherein the regulator (3) keeps the differential pressure constant at a preset value by means of a first flow regulator (4) also arranged axially in the connection pipe (6) and can be adjusted by an actuating part (8) which projects from the housing (2) and acts on a second seat (24), and by means of a presettable second flow regulator (5) which is arranged axially or coaxially thereto, wherein the flow cross section (9) is adjustable, which is characterized in that, when an actuator (29) that acts on the actuating part (8) is installed, the flow cross section (9) is adjustable by means of a handle (7) not covered by the actuator and that, when the actuator (29) is installed, the position of the handle (7) on a display unit (19) which is not covered by the actuator can be read, and the display unit (19) shows the presetting of the flow cross section (9).

16 Claims, 4 Drawing Sheets

(56) References Cited

U.S. PATENT DOCUMENTS

| | | | |
|---|---|---|---|
| 6,899,128 B2 * | 5/2005 | Oh | 137/556 |
| 7,255,127 B2 * | 8/2007 | Davidson | 137/495 |
| 2007/0262279 A1 * | 11/2007 | Marstorp et al. | 251/118 |

FOREIGN PATENT DOCUMENTS

| | | |
|---|---|---|
| DE | 10323981 | 4/2005 |
| GB | 2039344 | 8/1980 |
| WO | WO-2004107075 | 12/2004 |

* cited by examiner

FLOW- AND PRESSURE-CONTROL VALVE

CROSS REFERENCE TO RELATED APPLICATIONS

This application is the US-national stage of PCT application PCT/DE2008/000669, filed 18 Apr. 2008, published 22 Oct. 2009 as WO2009/127173, and claiming the priority of PCT patent application PCT/DE2008/000669 itself filed 18 Apr. 2008, whose entire disclosures are herewith incorporated by reference.

FIELD OF THE INVENTION

The invention relates to a valve assembly for regulating the rate of flow or differential pressure in liquid-conveying heating or cooling systems, consisting of a one-piece or multipart housing provided with an intake port and an output port and a connection passage arranged between them, a regulator which is arranged axially in the connection passage and furnished with a movable partition acted upon by a set point which changes a variable cross section in a differential-pressure-controlled manner by means of a sealing part acting on a first seat, wherein the regulator keeps the differential pressure constant at a preset value by means of a first flow regulator which is also arranged axially in the connection passage and can be adjusted by an actuating part which projects out of the housing and acts on a second seat, and by means of a presettable second flow regulator arranged axially or coaxially thereto, wherein the flow cross section is adjustable.

WO 2006/031161 (U.S. Pat. No. 7,735,514) discloses a valve assembly having a one-piece housing into which a part for regulating the differential pressure, a part for limiting the volume flow, a measuring nipple and a shut-off device are integrated. This valve assembly is designed in such a way that the volume flow can be preset in an infinitely variable manner by means of a tool and that the complete valve lift is always possible at every preset value.

The disadvantage of this design is that the presetting takes place from the difficult-to-access actuator side, and that the actuator must be removed for changing and/or reading the preset value.

DE 103 23 981 B 3 discloses a heating/valve arrangement having a two-part housing in which a first valve device that has a valve seat and a valve element is accommodated in the first part of the housing and a second valve arrangement which keeps the differential pressure constant over the first valve device is accommodated in the second part of the housing.

The disadvantage of this embodiment is that the presetting of the flow values is not provided.

In both previously known embodiments, the components are arranged axially to one another and arranged in a connection passage directed diagonally to the direction of flow of the medium.

DE 198 24 630 B4 discloses a valve assembly in which the individual components have not been axially built up. This arrangement requires more space and, in addition, a specific sequence is provided in which the components must be installed.

In the known valve arrangements with presetting, the disadvantage is that the presetting must always take place from the actuator side. Above all, this is disadvantageous because valve assemblies of this type are preferably installed in the ceiling area of rooms for controlling cooling ceilings and the like and they are installed preferably at a right angle with screwed-on electromotive, electrothermal or thermal actuators in order to protect the adjusting devices against condensation moisture dripping from the pipelines. In an installation position of this type, the presetting and the attached scale point to the difficult-to-access room ceiling. As a result, the corresponding elements both for the adjustment and for reading are difficult to access and difficult to see. In addition, in the known constructions, the actuator must first always be dismantled in order to be able to operate and/or read the presetting.

OBJECT OF THE INVENTION

Based on this prior art, the object of the invention is to create a valve assembly that is cost-effective to produce and has small dimensions, in which the control for the presetting is also easily accessible when the actuator is screwed on, and in which the respectively selected preset values can be easily read when the actuator is screwed on.

SUMMARY OF THE INVENTION

To solve this object, the invention proposes that, when the actuator is installed and acting on the actuating part, the flow cross section is adjustable by means of a handle not covered by the actuator, and that, with an installed actuator, the position of the handle can be read on a display which is not covered by the actuator and the display shows the presetting of the flow cross section.

By means of this design, it is possible to also adjust the flow cross section when the actuator is installed, since the handle is not covered by the actuator. Furthermore, the setting can also be read when the actuator is installed.

Due to the axial arrangement of the three assemblies—regulator, first flow regulator and second flow regulator—in the connection passage, wherein the second flow regulator can also be arranged coaxially about the first flow regulator, the valve assembly can be produced in a space-saving manner and with small dimensions. This is important since the installation conditions for a valve of this type are often very cramped. In particular, this is true for the preferred application in cooling ceiling installations where they must be installed within suspended ceilings.

After installation of the valve assembly, a functional test of the heating and/or cooling system usually takes place. In this case, the actuator is screwed onto the valve assembly as it is part of the function test. The hydraulic balancing of the individual system parts, e.g. cooling ceilings, also takes place within the scope of the system function test. To this end, the presetting of the second flow regulator changes and with it the maximum possible flow of the individual system parts is preset. In view of the fact that several hundred to several thousand of these valve assemblies are usually built badly in a system of this type, this signifies a considerable additional expenditure when the actuator must first be unscrewed for this purpose and then screwed on again after the presetting has been changed. After the functional test, it is furthermore necessary to produce the adjustment protocol. For this purpose, the preset values of each individual valve assembly, the installation position of which is accurately defined, is read and entered into the protocol. If the actuators have to be unscrewed and later screwed on again for reading the preset values, then a considerable additional expenditure is also produced in this case.

Also, in order to be able to quickly remove error functions during later operation of the system, it is helpful if the preset values can be read and corrected without the additional expenditure of dismantling the actuator. The noted expenditure is minimized by the solution according to the invention since all necessary steps can be performed with an installed actuator.

Preferably, it is provided that the arrangement is made such that the first regulator, then the first flow regulator, then the second flow regulator and subsequently the output port is arranged in flow direction following the intake port.

It can also be provided that first the first regulator and then the first flow regulator is arranged in flow direction, wherein the flow values are preset alternatively or in addition via an adjustable stroke limiter of the first flow regulator.

In a known manner, it can be provided that the movable partition is configured as a membrane.

In addition, it can be provided that the display is a scale.

A preferred further embodiment is seen in that the connection passage is open at both ends, that the flow cross section of the second flow regulator is adjustable with an actuating spindle passing through the connection passage and provided with a handle, and that the actuating part passes through the end of the connection passage opposite the handle for adjusting the first flow regulator.

As a result of the accessibility, possible at both ends, of the connection passage in which the three assemblies are arranged in a space-saving manner, the first flow regulator can be adjusted by the actuator from the one side of the connection passage and, opposite on the other side, the second flow regulator can be actuated by means of the handle.

As these valve assemblies are preferably installed in cooling ceiling systems within suspended ceilings and the actuators are preferably installed vertically to protect them against condensation water dripping from the pipelines, this design offers the advantage that, when the actuator is screwed on and pointing to the ceiling, the presetting and the readability of the selected preset values can be operated from the easily accessible side pointing toward the room.

In addition, it is preferably provided that the connection passage is equipped with fastening means for the actuator on its end opposite the handle.

The fastening means enable the easy attachment of the actuator. For example, screw or snap connections are possible as fastening means.

Furthermore, it is preferably provided that the second flow regulator is formed by at least two parts that can be reciprocally turned and/or shifted by means of the handle, the parts being provided with openings overlapping one another, wherein the size of the passage formed by the overlapping openings of at least one of the parts is adjustable by means of turning and/or shifting.

In this embodiment, the flow cross section is changed by a rotation of the handle, wherein it is advantageous to reciprocally turn the two openings forming the flow cross section and/or to reciprocally shift them axially. In the preferred embodiment, both parts are both reciprocally turned and also shifted axially to one another.

The shifting occurs due to the fact that the part provided with a thread is driven by the rotation of the handle and the other part, also provided with a thread, is shifted axially by the degree of the pitch corresponding to the angle of rotation. This simultaneously results in a lift limit of the first flow regulator, which can also be used for throttling the flow values. In this case also, the space-saving construction of the presetting is a special advantage.

It is furthermore preferred that the regulator, together with the first and second flow regulator, forms an assembly, which is firmly joined together by means of snap or screw connections and which can be inserted into the housing or connection passage as a unit.

An advantage is in the quick and trouble-free exchangeability of the entire interior of the valve. As a result, the valve is designed maintenance-friendly and the flow areas of the valve can also be quickly altered by the exchange. This can be required in system modifications or system expansions. In addition, therefore, the assembly of the valve can also be simplified in the manufacturing plant and consequently be more economical.

It is additionally provided that the housing is provided with one or more measuring connections for measuring pressure and/or temperature.

Measuring the differential pressure regulated by the valve is often prescribed for preparing adjustment protocols. For this purpose, the housing is provided with one or more measuring connections. However, the measuring connections are also of assistance for an error detection in the system that might be required. In addition to measuring pressures, they also enable the measurement of temperatures.

Furthermore, it is preferable if the handle is equipped with stops to limit the turning and/or lifting movement.

Limiting the rotary movement of the handle by stops is of assistance, as the lifting movement of the one turning and moving part is consequently easily restricted.

In addition, it is preferably provided that the regulator alters a variable cross section in a differential-pressure-controlled manner by means of the partition configured as a membrane, wherein the membrane is in the form of a roller membrane having a constant active surface which is acted upon, on the one hand, via a pressure duct in front of the first flow regulator and, on the other hand, via a pressure duct behind the second flow regulator.

The design of the membrane as a roller membrane offers the advantage that the membrane can perform a large lift in a small space. The constant active surface inherent in a roller membrane offers the advantage of a reduced proportional deviation of the regulator. The drop in pressure in front of the first flow regulator and behind the second flow regulator offers the advantage that the regulator keeps the differential pressure constant over both throttle cross sections and in this way ensures a high valve authority of the valve assembly.

In addition, it can be provided that a valve assembly can be sealed watertight by means of the first and/or the second flow regulator.

The watertight seal of the valve assembly offers the advantage that no further shut-off valve has to be installed in the pipeline for maintenance of the subsequently added system parts.

Preferably, it is further provided that the handle is fastened so as to be twist resistant but axially movable on the actuating spindle and is freely pivoted in a first lift position opposite the housing and locked in a twist resistant manner in a second lift position with the housing or a part torsionally mounted on it, such as a screw cap.

This results in the advantage of a presetting of the flow values secured against unintentional shifting. In particular, this is important when installing cooling ceiling systems within suspended ceilings, since various mechanisms (electric, heating, cooling, ventilation, insulation, etc.) work in succession here and consequently an unsecured presetting could be unintentionally shifted in this case.

In addition, it is preferably provided that the handle and the fastening spindle are provided with lift-limiting stops.

It is preferably provided that the handle is furnished with one or more twist-limiting stops to limit the rotation which act against a housing stop, wherein the housing stop is preferably simultaneously configured as a pointer.

The design of the housing stop as pointer forms the advantage that the rotary position of the handle can be easily ascertained by means of a scale imprinted on it and that no additional pointer is required beside the housing stop.

In addition, it is preferably provided that the handle is provided with one or more peripherally extending surfaces on which a scale is mounted which shows the position of the openings overlapping, the surfaces projecting diagonally over the housing diameter.

By imprinting the scale onto one or preferably more diagonal surfaces, a good readability of the scale from several sides is obtained. Above all, this is important when the view onto the scale is covered by other system parts.

Furthermore, it is preferably provided that the handle is held in the second lift position by a retaining ring which is inserted between handle and housing or parts mounted thereon, such as a screw cap.

The retaining ring can be mounted to obtain an additional security of the presetting against unintentional shifting. As a result, the interlocking of the parts always remains engaged and the handle can not be turned.

In addition, it is preferably provided that the handle is pressed into one of the two lift positions by a spring and that the second lift position is only adjustable by axial introduction of force on the handle.

This arrangement in association with the spring results in the advantage that the handle is always moved in its basic position after actuation in which it is interlocked with the corresponding part and in this way secured against unintentional movement. The handle does not become engaged with the corresponding elements which enable a movement and setting until the handle is moved against the force of the spring.

In addition, it can be preferably provided that the retaining ring is provided with a handle projecting beyond the housing diameter.

It can also be provided that the handle is provided with a lead-seal bore.

In addition, it can be provided that the housing stop is provided with a lead-seal bore which can be brought to coincide with the lead-seal bore of the handle.

BRIEF DESCRIPTION OF THE DRAWING

An example of an embodiment of the invention is shown in the drawings and described in greater detail in the following. The drawings show.

DETAILED DESCRIPTION

Figure 1:
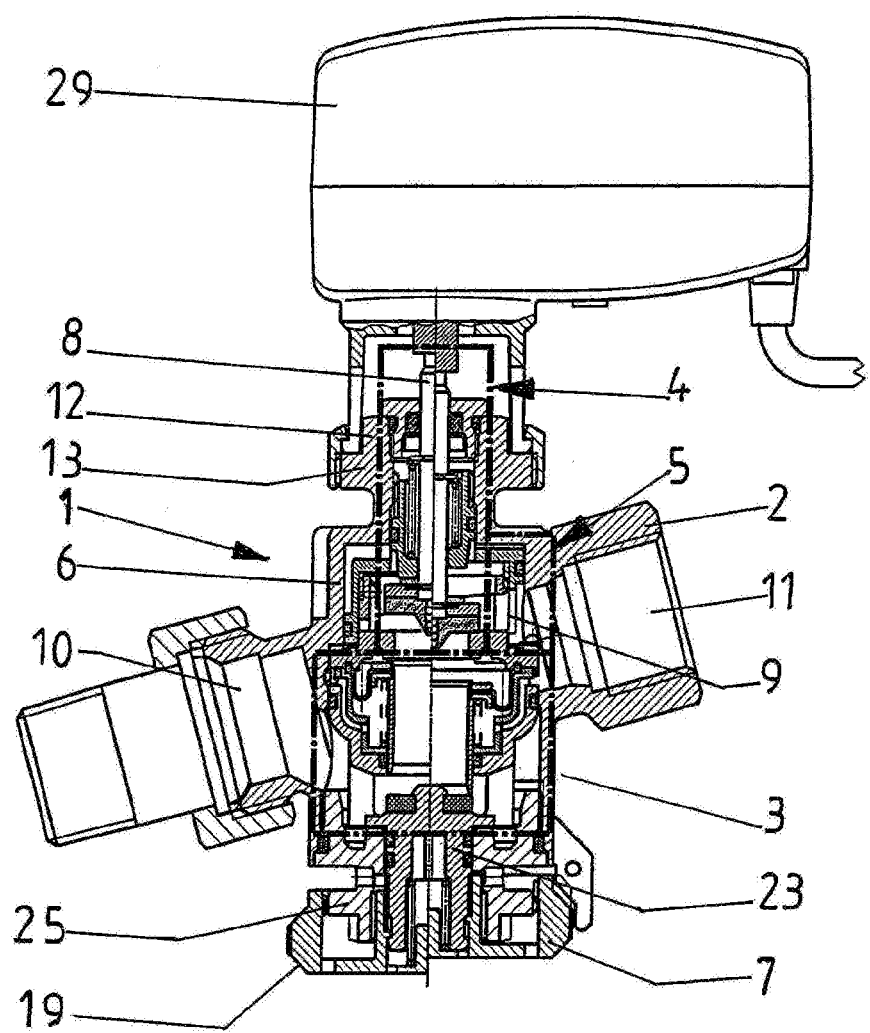
FIG. 1 the valve assembly with screwed-on actuator in two different positions, seen in the middle longitudinal section.

The drawing shows a valve assembly 1 for regulating the flow rate or the differential pressure in a liquid-conveying heating or cooling system. It consists of a housing 2 with an intake port 10 and an output port 11 as well as a connection passage 6 arranged between them. An upstream valve or regulator 3 is arranged axially in the connection passage 6, the regulator 3 being equipped with a movable partition 20 acted upon by a set-point value. It changes an opening 14 of variable cross section (FIG. 2) in a differential-pressure-controlled manner by means of a seal 22 acting on a first seat 21, wherein the regulator 3 keeps the differential pressure constant at a preset value by means of a first flow regulator 4 (FIG. 3) also arranged axially in the connection passage 6, the flow regulator 4 being adjustable by an actuating part 8 projecting out of the housing 2 which acts on a second seat 24 (forming part of an intermediate valve) and by means of a presettable downstream valve or second flow regulator 5 arranged axially or coaxially thereto. When an actuator 29 is installed and acts on the actuating part 8, the flow cross section of an opening 9 can be adjusted by means of a handle 7 not covered by the actuator 29. With an installed actuator 29, the position of the handle 7 can be read on a display 19 which is not covered by the actuator 29, wherein the display 19 shows the presetting of the flow cross section of the opening 9.

A seal 24' which interacts with the second seat 24 is arranged on the actuating part 8. The valve assembly 1 is arranged in such a way that flow is from the intake port 10 through the first regulator 3, then the first flow regulator 4, after that the second flow regulator 5 and finally the output port 11 in a direction of flow.

The movable partition 20 is a membrane. The display 19 is a scale.

The connection passage 6 is open at both ends. The opening 5 of variable flow cross section of the second flow regulator 5 is adjustable by an actuating spindle 23 provided with the handle 7 and passing through the connection passage 6. The actuating part 8 for shifting the first flow regulator 4 passes through the end 12 of the connection passage 6 opposite the handle 7. In this way, the first flow regulator 4 can be adjusted by the actuator 29 from the one side of the connection passage 6, and opposite on the other side the second flow regulator 5 can be actuated by means of the handle 7.

In addition, fastening means for the actuator 29 are provided on the end 12 of the connection passage 6. Fastening means of this type can, for example, be screw connections or also snap connections.

The flow cross section of the opening 9 can be changed by rotating the handle 7. As a result, the two openings 17, 18 forming the opening 9 of variable flow cross section are reciprocally turned and/or axially shifted against one another. In the embodiment, the rotatable and movable parts 15 or 16 are reciprocally turned and also axially shifted toward one another.

The shifting takes place due to the fact that the part 16 provided with a thread is driven by the rotation of the handle 7, the part 15, which is also provided with a thread, is axially shifted by the degree of the pitch corresponding to the angle of rotation. This simultaneously produces a lift limit of the first flow regulator 4, which can also be used to throttle the flow values.

In the illustrated embodiment, the regulator 3 together with the first and second flow regulators 4, 5 forms a common assembly which is securely joined by means of snap or screw connections 30. Thus, they can be inserted into the housing 2 or the connection passage 6 as a unit. In addition, measuring connections 31, 32 are provided on the housing for measuring pressure and/or temperature. The handle 7 is, in addition, provided with stops 33 to limit the rotary and/or lift movement.

The regulator 3 changes the variable cross section of the opening 14 in a differential-pressure-controlled manner by means of the partition 20 configured as a membrane, wherein the membrane 20 is configured as a roller membrane having a constant active surface which is, on the one hand, acted upon via a pressure duct 37 upstream of the first flow regulator 4 and, on the other hand, via a pressure duct 38 downstream of the second flow regulator 5.

The handle 7 is resistant to twist but axially movable on an actuating spindle 23 and freely pivotable in a first lift position against the housing 2 as well as interlocked in a torsion-resistant manner with the housing 2 via an antiturn-type mounted part, e.g. a screw cap 25, in a second lift position.

In addition, the handle 7 and the fastening spindle 23 have lift-limiting stops 26, 27. The handle 7 is equipped with one or more rotation-limiting stops 33 to limit the rotation which interact with a housing stop, wherein the housing stop is preferably at the same time configured as a pointer 34. The handle 7 is held in the second lift position by a retaining ring 35 which is inserted between handle 7 and housing 2 or parts mounted thereon, e.g. a screw cap 25. Furthermore, the handle 7 is pressed into one of the two lift positions by a spring 28. The second lift position can only be set by axial introduction of force on the handle 7 against the force of the spring 28. In addition, the retaining ring 35 is provided with a handle 36 protruding beyond the housing diameter. This handle 36 has a lead-seal bore which can be brought to coincide with the lead-seal bore of the handle 36, so that a sealing can take place.

In FIG. 1, the handle 7 is shown on the left side in the second lift position in which it is interlocked with the screw cap 25 so as to be resistant to twist. On the right side, it is shown in the first lift position in which it is freely pivotable against the housing 2.

It is always returned into the second lift position by the spring 28 mounted in the actuating spindle 23. With the handle 7, which is twist-resistant yet axially movable on the actuating spindle 23, the entire regulator 3 and the part 16 fastened to the regulator 3 so as to be resistant to twist can be turned without its axial position in the connection passage 6 being changed. The flow cross section of the opening 9 that is defined by the opening 17, 18, is changed by this rotation. The opening 18 is situated in the part 16 and the opening 17 in the part 15. The part 15 is held in a twist-resistant yet axially movable manner in the housing 2 by means of an engagement 40 and is screwed onto the part 16 with a thread. By turning the handle 7, part 15 is axially shifted. The lower lift position is shown on the left side of FIG. 1 and the upper lift position on the right side.

The rate of flow to be regulated flows through the valve assembly 1 in the following sequence: intake port 10, regulating insert 3, first and second flow regulator 4, 5 and output port 11. The flow can hereby be limited to a maximum value, both by the first flow regulator 4 and also by the second flow regulator 5.

The first flow regulator 4 is hereby set by the screwed-on actuator 29. The actuator 29 is, in turn, controlled, e.g. in dependence on the room temperature. The actuating part 8 is pressed against the tappet of the actuator 29 by a valve spring. The second flow regulator 5 is limited to a standard value on the flow of the valve assembly 1 required for the hydraulic balance.

Figure 2:
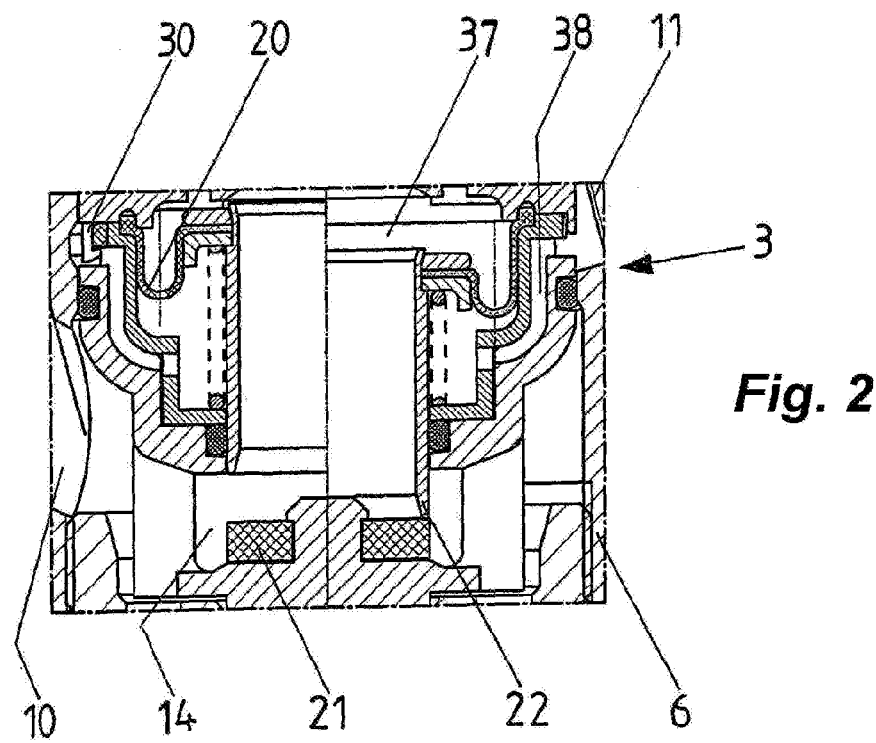
FIG. 2 the regulator as individual representation in two different lift positions.

The regulator 3 is shown in FIG. 2. The left side shows the upper lift position which would occur if the differential pressure above the first and second flow regulator 4, 5 were less than the force of the set-point spring acting on the membrane. The right side of FIG. 2 shows the lower lift position in which the seal 22 blocks against the seat 21. Furthermore, the drops in pressure in front of the first flow regulator 4 and behind the second flow regulator 5 can be seen (reference numbers 37, 38). The pressure duct 38 is also shown by means of which the pressure behind the second flow regulator is conveyed to the underside of the membrane 20.

Figure 3:
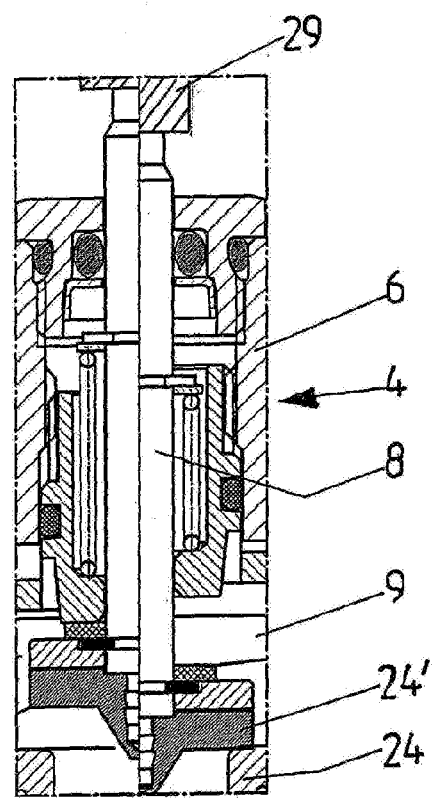
FIG. 3 the first flow regulator in two different lift positions.

The first flow regulator 4 with the actuating part 8 is shown in FIG. 3, which is pressed in a valve spring is pressed against the tappet of the actuator 29. The left side shows the fully opened position, while the right side shows the closed position of the flow regulator 4.

Figure 4:
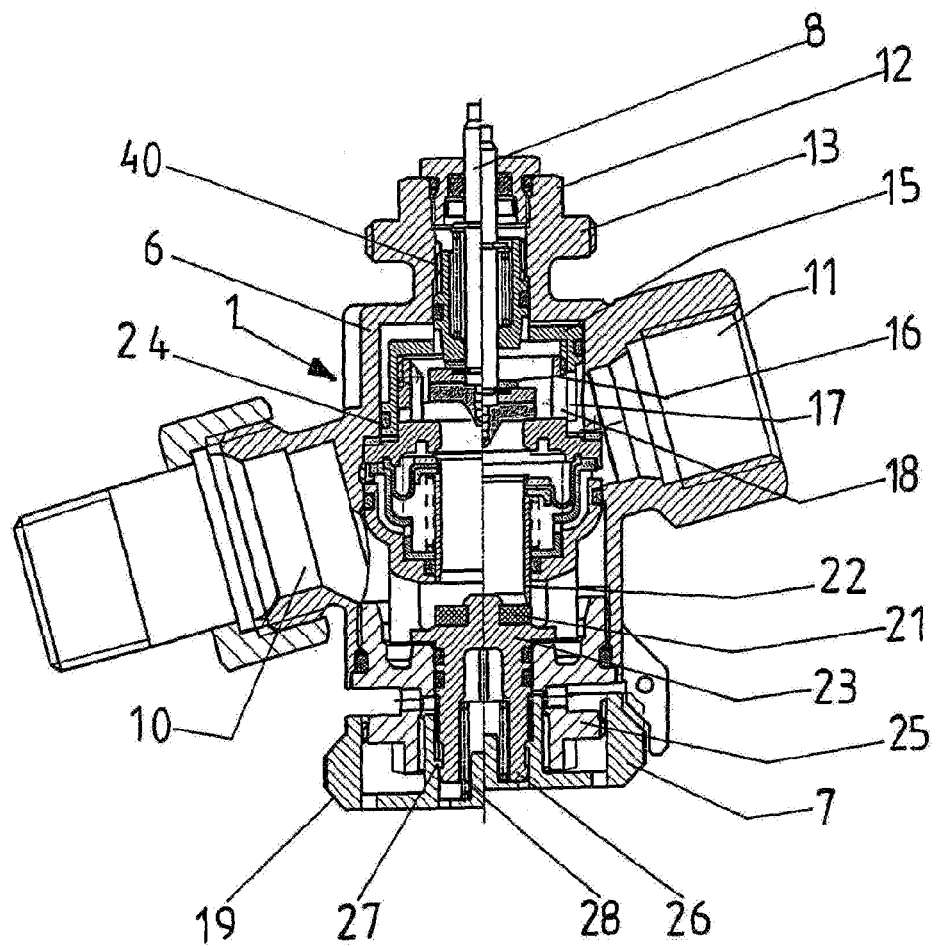
FIG. 4 the valve assembly in two different lift positions.

The illustration in FIG. 4 corresponds approximately to FIG. 1, wherein only the actuator 29 is not shown.

Figure 5:
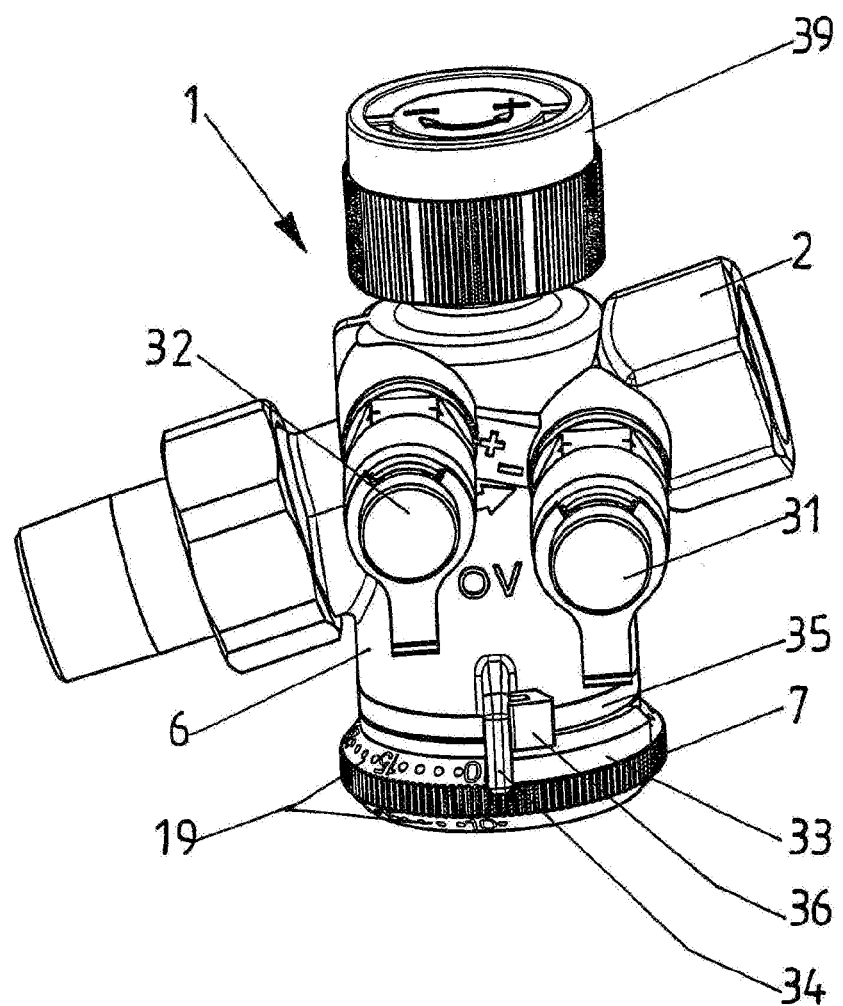
FIG. 5 a view of the valve assembly with retaining rings and pressure-measuring connection passage.

The valve assembly 1 is shown in view in FIG. 5. Instead of the actuator 29, a cap 39 is thereby screwed on by means of which the first flow regulator 4 can be manually sealed. Furthermore, the measuring connections 31, 32 and the handle 7 provided with two scales 19 are shown. The handle 36 of the mounted retaining ring 35 is shown turned to the housing stop configured as a pointer 34. In this position, the lead-seal bores attached to the pointer 34 and handle 36, respectively, align.

The invention is not restricted to the example of an embodiment but is variable in many ways within the scope of the disclosure.

All novel individual and combined features disclosed in the description and/or drawings are deemed to be essential to the invention.

The invention claimed is:

1. A flow-control valve comprising:
a valve housing having an intake port, an outlet port, and a flow passage extending therebetween in which liquid normally flows in a flow direction from the intake port to the outlet port;
a upstream valve defining an opening of variable flow cross section in the flow passage adjacent the intake port;
a downstream valve defining an opening of variable flow cross section in the flow passage adjacent the outlet port;
an intermediate valve defining an opening of variable flow cross section in the flow passage between the upstream and downstream valves;
a movable partition connected to the upstream valve and exposed on one side to pressure of liquid at the intake port and on an opposite side to pressure of liquid in the passage downstream of the upstream valve such that a pressure differential across the partition will vary the flow cross section of the upstream valve;
an actuator on one side of the housing;
an actuating part extending through the housing and connected between the actuator and the intermediate valve for control of the intermediate valve by the actuator on the one side of the housing;
a handle on an opposite side of the housing; and
an actuating spindle extending through the housing and connected between the downstream valve and the handle for controlling the downstream valve from the handle on the opposite side of the housing.

2. The valve assembly according to claim 1 wherein, relative to the flow direction, the intake port is upstream of the upstream valve and the downstream valve is upstream of the output port.

3. The valve assembly according to claim 1 wherein the movable partition is a membrane.

4. The valve assembly according to claim 1, further comprising a display on the housing juxtaposed with the handle.

5. The valve assembly according to claim 4, wherein the display is a scale.

6. The valve assembly according to claim 1 wherein the handle is mounted so as to be resistant to twist yet axially movable on the actuating spindle and freely pivotable in a first lift position against the housing and, in a second lift position, is locked in a twist-resistant manner with the housing or a part mounted on it in a twist-resistant manner by a screw cap.

7. The valve assembly according to claim 6 wherein the handle and the fastening spindle are provided with lift-limiting stops.

8. The valve assembly according to claim 6 wherein the handle can be held in the second lift position by a retaining ring between the handle and the housing screw.

9. The valve assembly according to claim 6 wherein the handle is pressed into one of the two lift positions by a spring and that the second lift position can only be adjusted by axial application of force to the handle.

10. The valve assembly according to claim 1 wherein the handle projects beyond the housing.

11. The valve assembly according to claim 1 wherein the housing is provided with fastening means for the actuator on its end opposite the handle.

12. The valve assembly according to claim 1 wherein the downstream valve is formed by at least two parts relatively movable by the handle and provided with overlapping openings forming the respective opening and adjustable by shifting at least one of the parts.

13. The valve assembly according to claim 1 wherein the housing is provided with one or more connections for measuring pressure or temperature.

14. The valve assembly according to claim 1 wherein the handle and housing have mutually engageable stops for limiting angular movement of the handle.

15. The valve assembly according to claim 1 wherein the housing can be sealed so as to be impervious to liquid by the upstream valve or the downstream valve.

16. The valve assembly according to claim 12 wherein the handle is provided with one or more diagonal surfaces extending peripherally and projecting beyond the housing, the scale being affixed to the surfaces which show the positions of the overlapping openings.

* * * * *